United States Patent [19]

Hastings

[11] 3,843,161
[45] Oct. 22, 1974

[54] TRAILER COUPLER ASSEMBLY

[76] Inventor: John I. Hastings, 3830 Minor Rd., Copley, Ohio 44321

[22] Filed: Dec. 4, 1972

[21] Appl. No.: 311,696

[52] U.S. Cl. ......... 280/423 R, 280/414 R, 280/422, 280/438 R
[51] Int. Cl. ........................................... B62d 53/06
[58] Field of Search ........ 280/423 R, 423 B, 414 R, 280/482

[56] References Cited
UNITED STATES PATENTS

| | | | |
|---|---|---|---|
| 2,393,016 | 1/1946 | Black | 280/423 B X |
| 2,635,892 | 4/1953 | Shutter | 280/489 |
| 2,810,588 | 10/1957 | Rozett | 280/414 R X |
| 3,288,315 | 11/1966 | Bigden | 280/423 R X |
| 3,348,859 | 10/1967 | Melbye | 280/414 R X |
| 3,552,775 | 1/1971 | Warner | 280/492 |
| 3,578,357 | 5/1971 | Bouman | 280/434 |
| 3,698,740 | 10/1972 | Chisholm | 280/423 B |

*Primary Examiner*—Leo Friaglia
*Assistant Examiner*—Randall A. Schrecengost
*Attorney, Agent, or Firm*—Freeman & Taylor

[57] ABSTRACT

A trailer coupling assembly adapted to be releasably secured to a conventional trailer is disclosed and includes means for attaching one end of the assembly to the conventional hitch of a trailer and the other end to the bed of a towing vehicle, such as a pick-up truck, forwardly of the rear axle thereof. The end of the assembly which is attached to the towing vehicle has a telescoped king pin assembly which connects with a fifth wheel assembly mounted on the towing vehicle and permits rotation of the coupler assembly about a longitudinal axis. Furthermore, the main body of the coupler assembly is constructed so as to clear the body of the towing vehicle, thereby permitting rotation about a vertical axis so that a dual movement is permitted and the assembly will permit the trailer to be turned as sharply as the towing vehicle can turn and also will permit it to accommodate for differences in the plane of the road surface beneath the towing vehicle and the trailer. Various support means are also provided to permit the carrying of additional items on the coupler assembly.

4 Claims, 7 Drawing Figures

TRAILER COUPLER ASSEMBLY

BACKGROUND OF THE INVENTION

This invention, in general, relates to trailer hitches and, in particular, relates to a unique means for attaching a conventional camper, travel, construction, mobile home or other type of trailer to a towing vehicle without any modification of the trailer itself.

SUMMARY OF THE INVENTION

Various hitches and coupling means are well known for securing a trailer to a towing vehicle.

Most of these, however, have certain disadvantages.

For example, with a conventional hitch arrangement, the point of support for the towed vehicle on the towing vehicle is usually considerably rearward of the rear axle and the transmission of the towing vehicle, thereby causing considerable difficulty and undue wear on the towing vehicle.

Furthermore, certain difficulties are encountered when the point of attachment is attempted to be moved forward of the rear axle because in most instances the turning radius of the vehicles will be considerably reduced. Additionally, difficulties are encountered in situations in which the towing vehicle is on one plane of road surface and the towed vehicle is on a different plane.

It is accordingly an object of this invention to provide a means for connecting a trailer to a towing vehicle without any modification of the trailer and with the point of support being forward of the rear axle of the towing vehicle while still permitting full turning radius and permitting irregularities in the road surface beneath the towed and towing vehicle to be accommodated.

Additionally, certain auxiliary attachments are provided on the coupler assembly to facilitate the carrying of additional items.

Accordingly, production of an improved coupler assembly having the above-noted characteristics becomes the principal objects of this invention, with other objects thereof becoming more apparent upon a reading of the following brief specification, considered and interpreted in view of the accompanying drawings.

BRIEF DESCRIPTION OF THE PREFERRED EMBODIMENT

Figure 1:
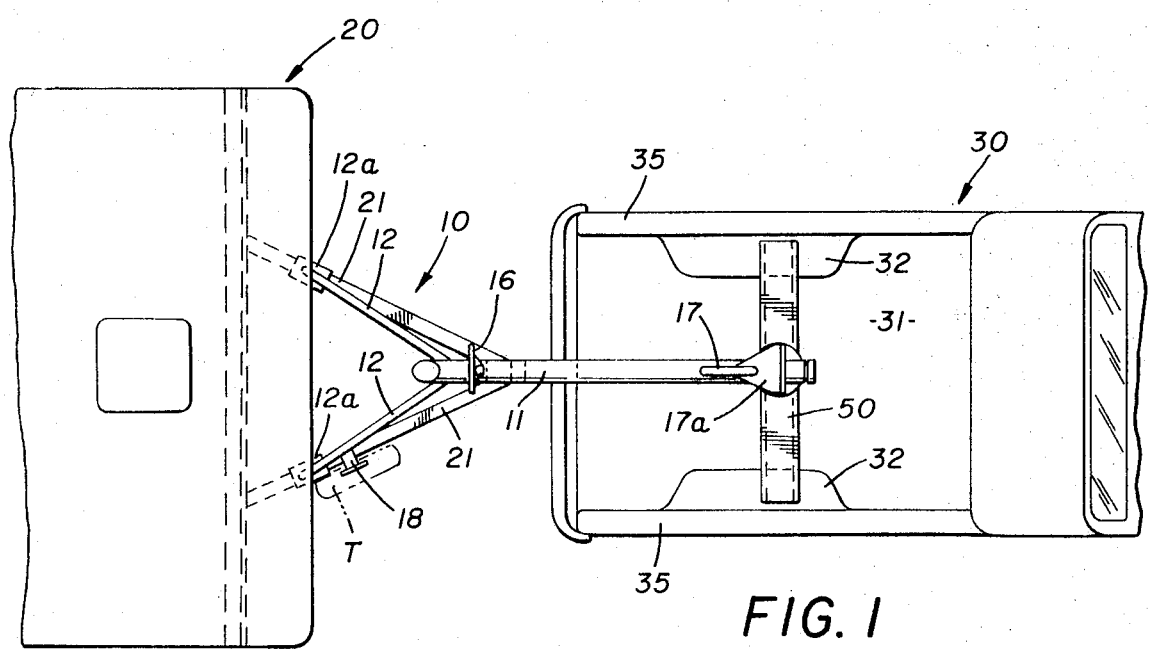
FIG. 1 is a top plan view of the assembly in place.

Referring first to FIG. 1, it will be noted that the coupler assembly, generally indicated by the numeral 10, interconnects the trailer 20 and the towing vehicle 30.

Figure 2:
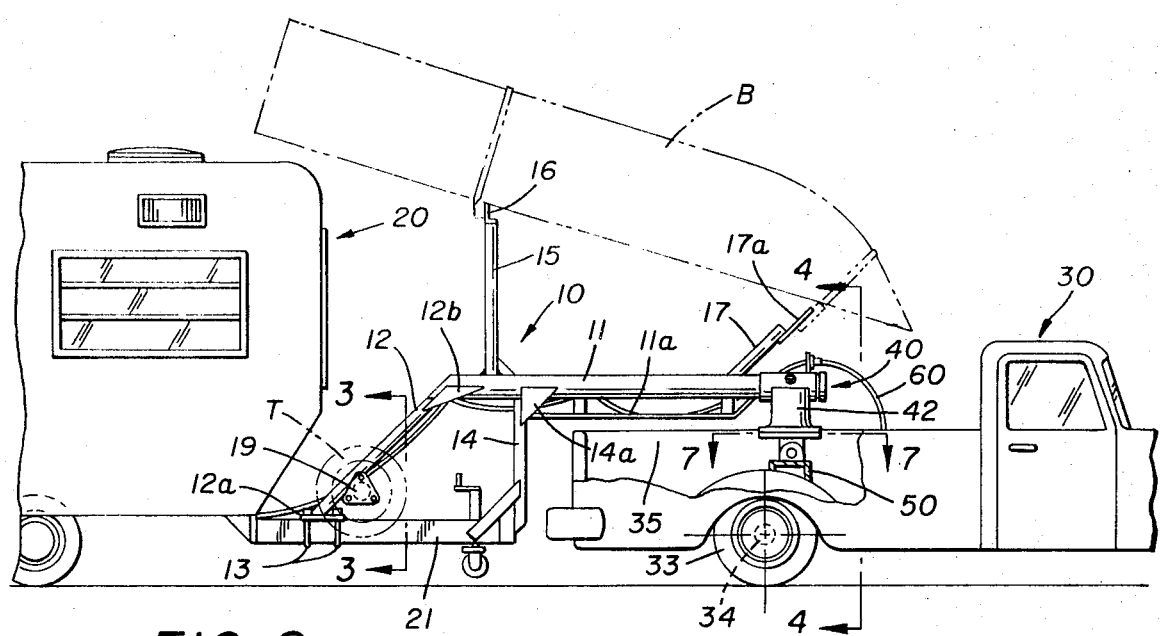
FIG. 2 is an elevational view of the assembly, in place, and showing the auxiliary items mounted on the assembly.

With further references to FIGS. 1 and 2, it will be noted that the trailer 20 has a conventional V-shaped hitch assembly projecting from its front end primarily consisting of two beams 21, 21 converging at their outboard ends and carrying the usual hitch coupling.

The towing vehicle 30 is illustrated as being a flatbedded pick-up type truck having a rear floor 31 and wheel wells 32,32 disposed on opposed sides thereof overlying wheels 33,33 and axle 34.

Neither the trailer nor the towing vehicle have been described in great detail inasmuch as they are of generally conventional construction.

Referring again to FIGS. 1 and 2, the coupler assembly, generally indicated by the numeral 10, will be seen to have a main beam 11 and diverging connecting beams 12,12 which project outwardly and downwardly from one end thereof and are welded or otherwise secured thereto. These beams are connected to the beams 21,21 of the trailer hitch by mounting plates 12a,12a and bolts 13,13. A reinforcing member 12b is provided adjacent the point of connection between the beams 12,12 and the main beam 11 as clearly shown in FIG. 2.

Main beam 11 also has depending therefrom a vertical support member 14. This support member has a conventional ball intended to be connected to the hitch coupling on the mounting point on the hitch of the trailer 20 in well known fashion. Since this structure is conventional it has not been illustrated in detail. Additionally, reinforcing plates 14a,14a are provided adjacent the point of connection of the vertical support member 14 and the main beam 11.

Figure 5:
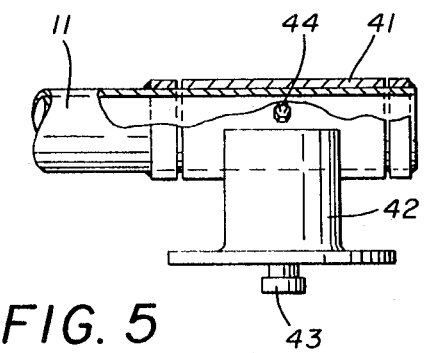
FIG. 5 is a partial elevational view partially broken away and illustrating the king pin assembly for connecting the coupler to the towing vehicle.
Figure 6:
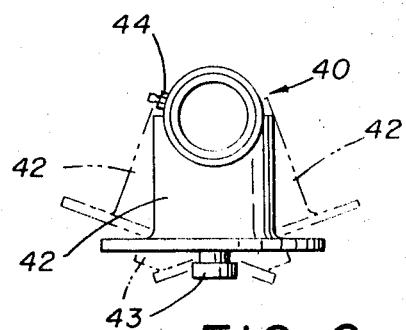
FIG. 6 is an end view of the assembly of FIG. 5 showing the method of movement.

Proceeding to the forward or projecting end of the coupler assembly 10, it will be noted that a sleeve 41 is journaled about the end of the tubular support beam 11, with this assembly including a bell-shaped member 42 having a king pin 43 of conventional construction thereon. A lubrication fitting 44 is also provided, and referring to FIGS. 5 and 6 it will be noted that the sleeve 41 is capable of rotational movement about the longitudinal axis of the beam 11 as shown in broken lines in FIG. 6 for purposes which will be described below.

The coupler assembly 10 also includes an auxiliary frame 11a and certain accessory mounting units.

Figure 3:
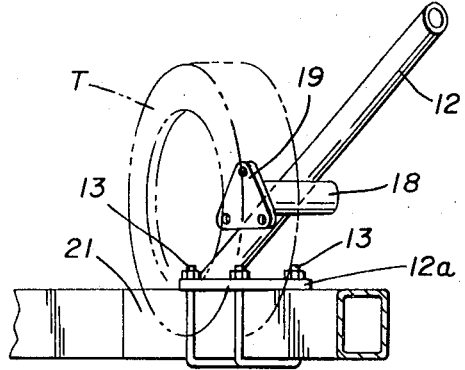
FIG. 3 is a sectional view taken along the lines 3—3 of FIG. 2.

Thus and referring to FIGS. 2 and 3, a spare tire mounting member is secured to one of the beams 12,12 and includes a stub beam 18, welded or otherwise to the beam 12, which has a mounting plate 19 thereon and is intended to be capable of receiving a tire T as shown in FIGS. 1, 2, and 3.

Projecting upwardly from the top of the main beam 11 is also a vertical support member 15 having an attachment plate 16 on its outboard end. Adjacent the forward end of the coupler assembly 10 is a second support member 17 having an attachment plate 17a. Referring to FIG. 2 of the drawings, it will be apparent how a boat B can readily be mounted on the support members 15 and 17 and secured to the plates 16 and 17a.

Conventional power connections can also be accomplished by the cable 60 which leads from the trailer 20 to the towing vehicle 30 and is attached thereto in conventional fashion.

Figure 4:
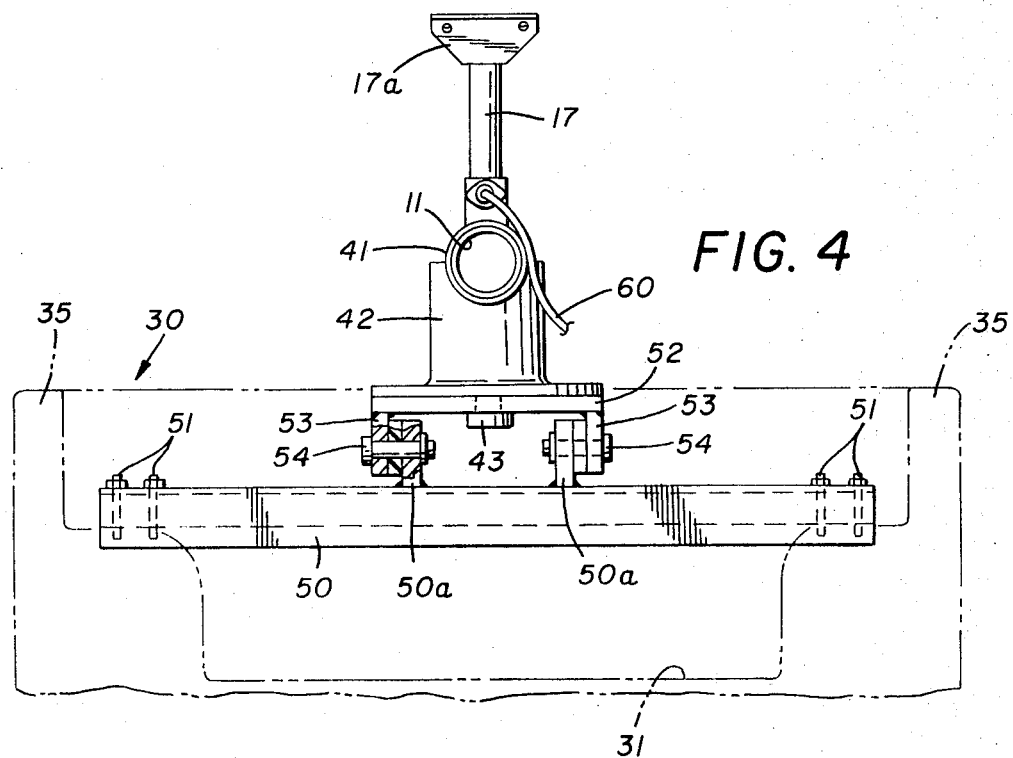
FIG. 4 is a sectional view taken along the lines 4—4 of FIG. 2.
Figure 7:
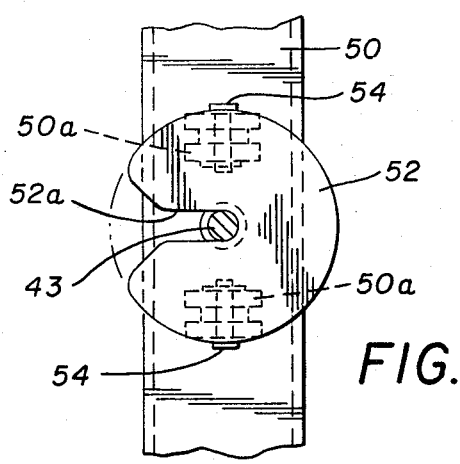
FIG. 7 is a sectional view taken along the lines 7—7 of FIG. 2.

Considering next the means for securing the coupler assembly to the towing vehicle, reference is particularly made to FIGS. 4 and 7.

As previously noted, the bell-shaped member 42 carries a king pin 43.

The attachment means include an elongate beam 50 which is bolted or otherwise secured by means of bolts 51,51 to the wheel wells of the pick-up truck. It should be noted from FIGS. 1 and 2, for example, that the point of mounting is forward of the axis of the rear axle of the truck so that the weight will be properly distributed.

Welded to the beam 50 are a pair of upright members 50a,50a which are pinned as at 54,54 to the bottom of a fifth wheel plate 52. The pins pass through depending portions 53,53, and this fifth wheel assembly is of conventional design.

It will be noted that the king pin 43 slips into the opening 52a in the plate 52 in well known fashion.

In use of the device it is merely necessary to bolt the beams 12,12 to the conventional and existing hitch on the trailer as clearly shown in FIG. 2, by means of the plates 12a,12a and the bolts 13,13.

Assuming that beam 50 and fifth wheel plate 52 have been mounted in truck bed 31, it is then merely necessary to engage the king pin 43 with the notch in the plate 52, following which the assembly is ready for operation.

It should be pointed out here that the telescoping connection between the sleeve 41 and the main beam 11 permits, as noted above with regard to FIG. 6, rotation of the entire king pin assembly about the axis of beam 11. This will permit compensation for situations in which the wheels of the towing vehicle are on one plane and the wheels of the towed vehicle are on another.

Furthermore, it will be noted that by provision of the upright or vertical support 14, the main beam 11 is disposed above the side walls 35,35 of the towing vehicle. In this fashion pivoting about the axis of the king pin 43 can be accomplished, and a full turning radius can be provided without any interference between the coupler assembly 10 and the body of the towing vehicle.

Furthermore, it is readily apparent that no modification of the trailer 20 is required at all with the coupler assembly cooperating with the existing hitch assembly. Thus the coupler assembly can readily be removed if desired and the trailer again towed in conventional fashion.

While a full and complete description of the invention has been set forth in accordance with the dictates of the Patent Statutes, it should be understood that modifications can be resorted to without departing from the spirit hereof or the scope of the appended claims.

What is claimed is:

1. A trailer coupling assembly for interconnecting a towed vehicle having a standard V-shaped hitch on its front end to a towing vehicle, comprising;
   A. a main body portion having first and second ends;
   B. V-shaped first support means
      1. depending from said main body portion adjacent said first end and
      2. having its legs releasably secured to the legs of said V-shaped hitch;
   C. second support means
      1. depending from said main body portion inwardly of said first end and
      2. being releasably secured to said V-shaped hitch of said towed vehicle; and
   D. third support means including
      1. a king pin depending from said main body portion adjacent said second end thereof and pivotally supported thereby for swinging about the longitudinal axis thereof, and
      2. a fifth wheel assembly mounted on said towing vehicle
      3. said king pin being releasably secured to said fifth wheel assembly on said towing vehicle at a point forward of the rear axle thereof and
      4. being swingable about the vertical axis of said king pin.

2. The assembly of claim 1 further characterized by the presence of opposed auxiliary support means carried by and projecting upwardly from said main body portion adjacent said first and second ends thereof.

3. The assembly of claim 1 further characterized by the fact that said third support means is secured to said towing vehicle at a point lying in a plane above the plane in which said first and second support means are secured to said hitch of said towed vehicle whereby said main body portion is disposed above the sides of said towing vehicle.

4. The assembly of claim 1 further characterized by the fact that said third support means includes a housing mounted on said main body for swingable movement about the longitudinal axis thereof; said king pin being secured to said housing.

* * * * *